United States Patent
Matsuda

(10) Patent No.: US 9,667,155 B2
(45) Date of Patent: May 30, 2017

(54) SWITCHING POWER SUPPLY WITH PEAK CURRENT LIMITER

(71) Applicant: Fuji Electric Co., Ltd., Kanagawa (JP)

(72) Inventor: Naotaka Matsuda, Tokyo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 14/988,455

(22) Filed: Jan. 5, 2016

(65) Prior Publication Data

US 2016/0204705 A1 Jul. 14, 2016

(30) Foreign Application Priority Data

Jan. 8, 2015 (JP) ................................. 2015-002627

(51) Int. Cl.
*H02M 3/335* (2006.01)
*H02M 1/32* (2007.01)

(52) U.S. Cl.
CPC ......... *H02M 3/33507* (2013.01); *H02M 1/32* (2013.01); *H02M 3/33515* (2013.01); *H02M 3/33523* (2013.01)

(58) Field of Classification Search
CPC ......... H02M 3/33507; H02M 3/33523; H02M 3/33515
See application file for complete search history.

(56) References Cited

U.S. PATENT DOCUMENTS

| | | | | |
|---|---|---|---|---|
| 7,394,670 | B2* | 7/2008 | Koike | H02M 3/33523 363/19 |
| 2007/0291516 | A1* | 12/2007 | Nakamura | H02M 1/32 363/21.01 |
| 2012/0155122 | A1* | 6/2012 | Tang | H02M 3/33507 363/21.15 |
| 2015/0043252 | A1* | 2/2015 | Kuang | H02M 3/33507 363/21.16 |
| 2015/0048755 | A1* | 2/2015 | Imanaka | H02M 3/33507 315/291 |

FOREIGN PATENT DOCUMENTS

JP 2008-005567 A 1/2008

* cited by examiner

*Primary Examiner* — Nguyen Tran
*Assistant Examiner* — Ishrat Jamali
(74) *Attorney, Agent, or Firm* — Chen Yoshimura LLP

(57) ABSTRACT

A switching power supply includes: a transformer having a primary coil and a secondary coil; a switching element that is connected in series to the primary coil of the transformer so as to turn a direct-current input voltage applied to the primary coil of the transformer ON and OFF; a rectifying and smoothing circuit that rectifies a voltage induced in the secondary coil of the transformer to generate a direct-current output voltage; and a control circuit that turns the switching element ON and OFF in accordance with the direct-current output voltage, wherein the control circuit includes an input correction circuit that detects a switching period of the switching element and limits a peak value of a current flowing through the switching element in accordance with the detected switching period.

7 Claims, 4 Drawing Sheets

SWITCHING POWER SUPPLY WITH PEAK CURRENT LIMITER

BACKGROUND OF THE INVENTION

Technical Field

The present invention relates to a switching power supply that maintains a prescribed overcurrent protection level regardless of fluctuations in input voltage.

Background Art

Quasi-resonant switching power supplies are equipped with a switching element connected in series to the primary coil of a transformer to which a DC input voltage is applied. This switching element turns the DC input voltage ON and OFF. Examples of such a switching element include IGBT devices and power MOSFETs. These types of switching power supplies are also equipped with a rectifying and smoothing circuit that rectifies the voltage induced in the secondary coil of the transformer to generate a DC output voltage. The switching element is turned ON and OFF according to this DC output voltage.

The control circuit that controls the switching element typically turns the switching element OFF when the current flowing while the switching element is ON reaches a certain feedback control value calculated according to the DC output voltage. Then, when the current flowing in the transformer while the switching element is OFF inverts, the control circuit turns the switching element back ON to achieve quasi-resonance in the current flowing through the transformer.

A control circuit that turns the switching element ON and OFF in this manner is known as a quasi-resonant control circuit. As the switching element is repeatedly turned ON and OFF, the current that flows through the primary coil of the transformer induces a voltage in the secondary coil of the transformer, and the rectifying and smoothing circuit generates a DC output voltage.

This type of control circuit (a quasi-resonant control circuit) typically includes an overcurrent protection circuit that limits the peak current that can flow through the switching element. As disclosed in Patent Document 1, for example, this overcurrent protection circuit measures a current detection signal that corresponds to the current flowing through the switching element when the switching element is turned ON. When the current detection signal exceeds a predetermined threshold current value, the overcurrent protection circuit determines that the switching element is in an overcurrent state and forcibly turns OFF the switching element to protect the switching element from that overcurrent.

Patent Document 1 also discloses a method for improving the dependence of the overcurrent protection circuit on the DC input voltage. In this method, a pulse-shaped forward voltage that is proportional to the DC input voltage and is induced in the auxiliary coil of the transformer when the switching element is ON is detected, and the threshold current value for overcurrent protection is changed according to the detected forward voltage. More specifically, the dependence of the overcurrent protection feature on changes in the DC input voltage is reduced by implementing an input correction control scheme in which the higher the DC input voltage becomes, the lower the threshold current value is set.

RELATED ART DOCUMENT

Patent Document

Patent Document 1: Japanese Patent Application Laid-Open Publication No. 2008-005567

SUMMARY OF THE INVENTION

However, when using a switching power supply of the type described above to obtain the same output power across an AC input voltage range as wide as 85-264V and which may include voltage fluctuations as large as 100V or 200V, for example, the higher the DC input voltage applied to the primary coil of the transformer becomes, the lower the current that flows through the switching element becomes. Therefore, if the current flowing through the switching element is less than the threshold current value for overcurrent protection, the output power of the switching power supply increases when the DC input voltage is high. Such an increase in output power may cause problems such as extra stress on the load or excess heat generation in the transformer, for example.

One way of preventing these problems is the solution disclosed in Patent Document 1, in which the threshold current value for overcurrent protection is changed drastically according to the pulse-shaped forward voltage that is proportional to the DC input voltage and is induced in the auxiliary coil of the transformer. However, making large changes to the threshold current value to allow for a wide range of DC input voltages requires configuring a relatively complicated input correction circuit to address issues such as being able to set a wide detection range for the forward voltage.

The present invention was made in view of the above-mentioned problems and aims to provide a switching power supply that has a simple configuration and in which the dependence of overcurrent protection on changes in the DC input voltage is reduced by focusing on the switching period used to turn the switching element ON and OFF (rather than on a forward voltage proportional to the DC input voltage and induced in the auxiliary coil of the transformer) in order to make it possible to change a current control threshold value (the threshold current value for overcurrent protection) in a simple manner.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching power supply, including: a transformer having a primary coil and a secondary coil; a switching element that is connected in series to the primary coil of the transformer so as to turn a direct-current input voltage applied to the primary coil of the transformer ON and OFF; a rectifying and smoothing circuit that rectifies a voltage induced in the secondary coil of the transformer to generate a direct-current output voltage; and a control circuit that turns the switching element ON and OFF in accordance with the direct-current output voltage, wherein the control circuit includes an input correction circuit that detects a switching period of the switching element and limits a peak value of a current flowing through the switching element in accordance with the detected switching period.

The control circuit is a quasi-resonant control circuit that causes resonance in a current flowing in the transformer by turning the switching element OFF when a current flowing through the switching element while the switching element is ON reaches a feedback control value determined in accordance with the direct-current output voltage and turning the switching element ON when the current flowing in the transformer while the switching element is OFF has inverted.

It is preferable that the input correction circuit include a period detection circuit that detects the switching period T of the switching element; a calculation circuit that calculates a control value $T^{1/2}(=\sqrt{T})$ based on the switching period T detected by the period detection circuit; and a comparison voltage generation circuit that obtains, in accordance with the control value $T^{1/2}$ calculated by the calculation circuit, a current limit threshold value VthIS for limiting the peak value of the current that flows through the switching element.

More specifically, the period detection circuit obtains the switching period T of the switching element from a timing at which a current flowing in the transformer while the switching element is OFF has inverted, for example. Alternatively, the period detection circuit obtains the switching period T of the switching element using a drive signal for turning the switching element ON and OFF.

Moreover, the input correction circuit may include: a frequency detection circuit that detects a switching frequency f of the switching element; a calculation circuit that calculates a control value $T^{1/2}(=\sqrt{T})$ based on the switching period T as obtained from the switching frequency f detected by the frequency detection circuit; and a comparison voltage generation circuit that obtains, in accordance with the control value $T^{1/2}$ calculated by the calculation circuit, a current limit threshold value VthIS for limiting the peak value of the current that flows through the switching element, for example.

During a normal load, the control circuit compares a current detection value Vis corresponding to the current flowing through the switching element to the feedback control value Vfb detected in accordance with the direct-current output voltage, and during an overload, compares the current detection value Vis to the current limit threshold value VthIS generated by the input correction circuit in order to forcibly turn OFF the switching element and thereby limit the peak value of the current that flows through the switching element. More specifically, the control circuit compares the current detection value Vis that corresponds to the current flowing through the switching element to a higher voltage among the feedback control value Vfb and the current limit threshold value VthIS to turn the switching element OFF.

In the switching power supply configured as described above, the switching period T used to turn the switching element (which is connected in series to the primary coil of the transformer) ON and OFF is used to make it possible to easily calculate a control value $T^{1/2}(=\sqrt{T})$. Furthermore, this control value $T^{1/2}$ is used to obtain a current limit threshold value VthIS to which to limit the peak current that can flow through the switching element in order to implement overcurrent protection. Therefore, in at least one aspect the present invention makes it possible to obtain a fixed output power while implementing reliable overcurrent protection for the switching element even when the DC input voltage fluctuates widely.

The output power Po of the switching power supply configured as described above is given by the following equation:

$$Po=(1/2)\cdot Lp\cdot Ipp^2\cdot f$$

where Lp is the inductance of the primary coil of the transformer, Ipp is the peak current that flows through the switching element, and f is the switching frequency of the switching element.

Solving this equation for the peak current Ipp yields:

$$Ipp = \{2Po/(Lp\cdot f)\}^{1/2}$$
$$= (1/f)^{1/2}\cdot(2Po/Lp)^{1/2}$$

In this equation, the quantity $(2Po/Lp)^{1/2}$ is a characteristic value of the switching power supply determined by factors such as the design of the switching power supply. Moreover, the reciprocal of the switching frequency f (that is, 1/f) is equal to the switching period T. Therefore, letting the quantity $(2Po/Lp)^{1/2}$ be a constant K, the switching element peak current Ipp needed to obtain a fixed output power Po is:

$$Ipp \propto T^{1/2}\cdot K$$

Therefore, as described above, using the current limit threshold value VthIS calculated from the square root $T^{1/2}$ $(=\sqrt{T})$ of the switching period T to limit the peak current Ipp that can flow through the switching element makes it possible to easily and effectively implement overcurrent protection for the switching element regardless of whether there are large fluctuations in the DC input voltage.

It is to be understood that both the foregoing general description and the following detailed description are exemplary and explanatory, and are intended to provide further explanation of the invention as claimed.

DETAILED DESCRIPTION OF EMBODIMENTS

Next, a switching power supply according to an embodiment of the present invention will be described with reference to figures.

Figure 1:
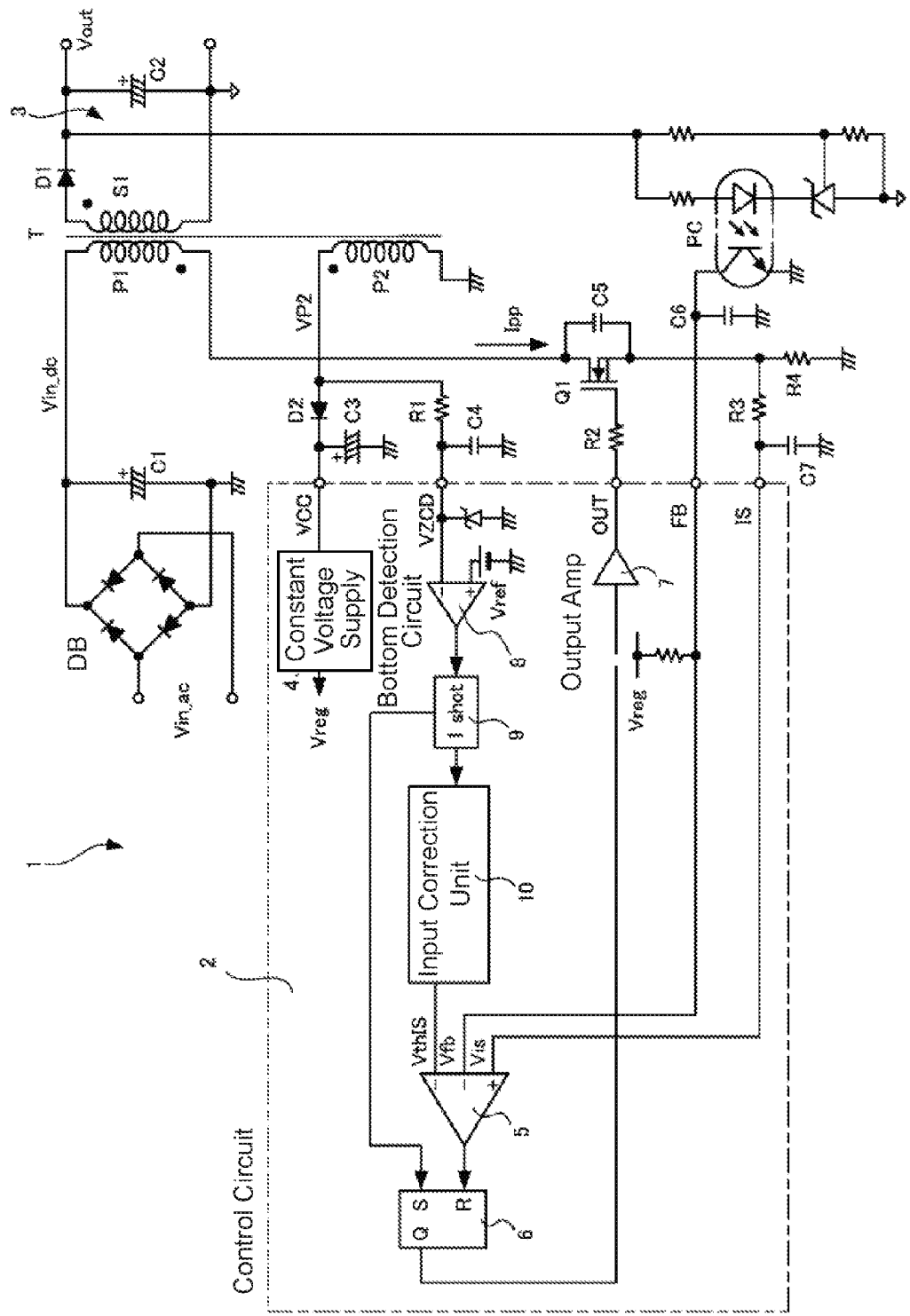
FIG. 1 schematically illustrates a configuration of a switching power supply according to an embodiment of the present invention.

FIG. 1 schematically illustrates a configuration of a switching power supply 1 according to an embodiment of the present invention. In FIG. 1, T is a transformer, P1 is the primary coil of the transformer T, and Vin_dc is the DC input voltage applied to the primary coil P1. The DC input voltage Vin_dc is generated by rectifying an AC input voltage using a diode bridge circuit DB and then smoothing the output using a smoothing capacitor C1. The switching power supply 1 includes a switching element Q1 that turns the DC input voltage Vin_dc ON and OFF and that is typically connected in series to the primary coil P1 of the transformer T. This switching element Q1 is a power MOSFET or an IGBT device, for example, and is turned ON and OFF by a control circuit 2.

The switching power supply 1 also includes a rectifying and smoothing circuit 3 that rectifies the voltage induced in a secondary coil S1 of the transformer T as the switching element Q1 is turned ON and OFF in order to generate a DC output voltage Vout. The rectifying and smoothing circuit 3 includes a diode D1 that rectifies the voltage induced in the secondary coil S1 of the transformer T and a smoothing capacitor C2 that smooths the output from the diode D1, for example.

Here, the control circuit 2 typically turns the switching element Q1 ON and OFF according to a feedback control value Vfb generated using the DC output voltage Vout and also according to a current detection value Vis generated using the current flowing through the switching element Q1. More specifically, the feedback control value Vfb is the error voltage between a predetermined output control voltage and the DC output voltage Vout, and this error voltage is fed back into the control circuit 2 via a photocoupler PC. Moreover, the current flowing through the switching element Q1 is detected as a voltage in a shunt resistor R4 that is connected in series to the switching element Q1, and this voltage is converted to the current detection value Vis using a filter made from a resistor R3 and a capacitor C7 and then input to the control circuit 2.

While the switching element Q1 is ON, the control circuit 2 compares the feedback control value Vfb and the current detection value Vis using a current comparator 5. When the feedback control value Vfb becomes greater than the current detection value Vis, the control circuit 2 turns the switching element Q1 OFF. More specifically, when the feedback control value Vfb becomes greater than the current detection value Vis, the current comparator 5 resets a flip-flop 6 that controls whether the switching element Q1 is ON or OFF.

The flip-flop 6 generates an [H] Q output when set and an [L] Q output when reset. These Q outputs are used as drive signals to turn the switching element Q1 ON and OFF. To turn the switching element Q1 OFF, the reset output [L] of the flip-flop 6 is applied to a control terminal of the switching element Q1 via an output amplifier 7.

A pulse-shaped voltage VP2 that is proportional to the DC input voltage Vin_dc and is induced in an auxiliary coil P2 of the transformer T while the switching element Q1 is ON is rectified using a diode D2, passed through a smoothing capacitor C3, and then applied to the control circuit 2 as a drive voltage VCC. In the control circuit 2, this drive voltage VCC is input to a constant voltage source 4 to generate an internal supply voltage Vreg needed to power components of the control circuit 2 such as the current comparator 5.

Meanwhile, while the switching element Q1 is OFF, the pulse-shaped voltage VP2 induced in the auxiliary coil P2 of the transformer T is passed through a filter circuit constituted by a resistor R1 and a capacitor C4 and then input to the control circuit 2 as a bottom detection signal VZCD. This bottom detection signal VZCD is clamped to a prescribed voltage using a Zener diode ZD and then applied to a bottom detection circuit 8 constituted by a comparator. This bottom detection circuit 8 compares the bottom detection signal VZCD clamped using the Zener diode ZD with a preset reference voltage Vref while the switching element Q1 is OFF to detect when the current flowing in the transformer T inverts (that is, to detect the bottom value of the current flowing in the transformer T).

A one-shot circuit 9 is triggered when the bottom detection circuit 8 detects that the current has inverted while the switching element Q1 is OFF, and the output of this one-shot circuit 9 is used to set the flip-flop 6. To turn the switching element Q1 ON, this set output [H] of the flip-flop 6 is applied to the control terminal of the switching element Q1 via the output amplifier 7. Repeatedly setting and resetting the flip-flop 6 in the control circuit 2 to turn the switching element Q1 ON and OFF makes it possible to achieve quasi-resonance in the current flowing through the primary coil P1 of the transformer T, thereby making it possible to induce a prescribed voltage in the secondary coil S1 of the transformer T.

Figure 2:
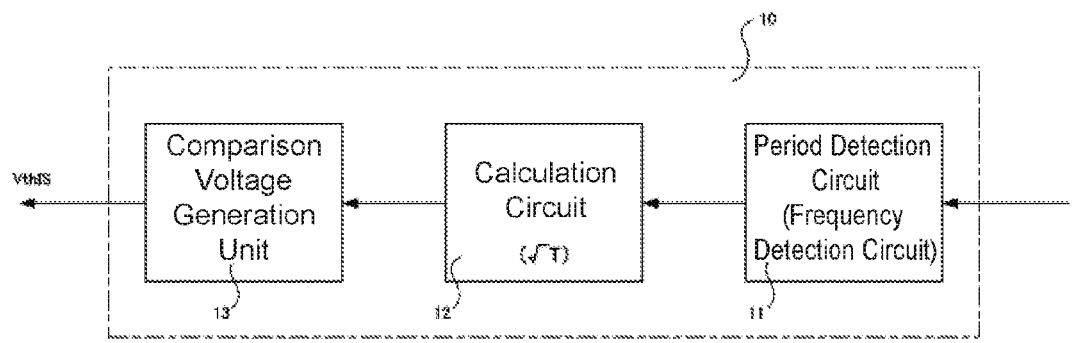
FIG. 2 illustrates an example of a configuration of an input correction circuit for the switching power supply illustrated in FIG. 1.

The characteristic feature of the switching power supply 1 according to the present embodiment is the input correction circuit 10, which generates, according to the switching period T of the switching element Q1, a current limit threshold value VthIS used to limit the peak current Ipp that can flow through the switching element Q1. As illustrated in FIG. 2, the input correction circuit 10 includes a period detection circuit 11 that detects the switching period T of the switching element Q1 and a calculation circuit 12 that calculates the control value $T^{1/2}(=\sqrt{T})$ using the switching period T detected by the period detection circuit 11, for example. The input correction circuit 10 also includes a comparison voltage generation circuit 13 that calculates, according to the control value $T^{1/2}$ from the calculation circuit 12, the current limit threshold value VthIS used to limit the peak current Ipp that can flow through the switching element Q1 and then applies that current limit threshold value VthIS to the current comparator 5.

More specifically, the period detection circuit 11 uses a high speed clock signal with a constant period to measure the period T of the pulse signal output by the one-shot circuit 9, for example. The period T of the pulse signal can be measured by counting the total number of high speed clock cycles that occur during one cycle of the pulse signal and using that total number of cycles as the switching period T of the switching element Q1, for example. Then, the calculation circuit 12 takes the square root of the switching period T to calculate the control value $T^{1/2}(=\sqrt{T})$. The comparison voltage generation circuit 13 then multiplies this control value $T^{1/2}(=\sqrt{T})$ by a prescribed coefficient to obtain the current limit threshold value VthIS, for example, as given by:

$$VthIS \propto T^{1/2} \cdot K$$

Figure 3:
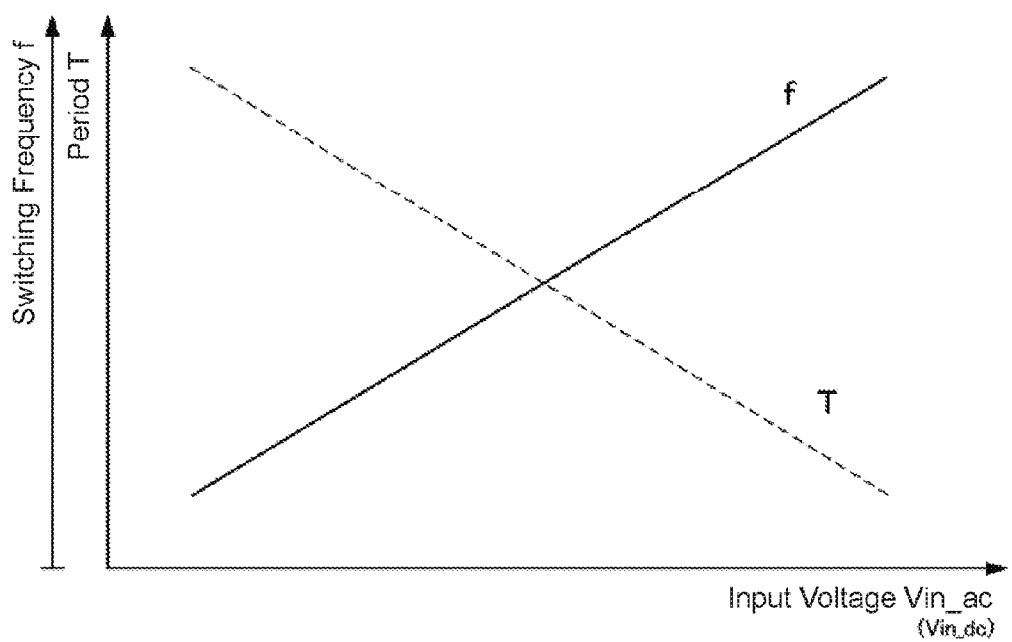
FIG. 3 is a graph showing the changes in switching period T and switching frequency f according to changes in input voltage.

As shown in FIG. 3, when generating a fixed output voltage Vout in the switching power supply 1, the switching frequency f of the switching element Q1 increases as the input voltage Vin (Vin_ac or Vin_dc) increases. Conversely, as shown by the dashed line in FIG. 3, the switching period T (which is the reciprocal 1/f of the switching frequency f) of the switching element Q1 decreases as the input voltage Vin (Vin_ac or Vin_dc) increases. Therefore, the switching frequency f and the switching period T of the switching element Q1 correlate with changes in the input voltage Vin (Vin_ac or Vin_dc).

Meanwhile, the output power Po of the switching power supply 1, which uses the flyback scheme to take advantage of quasi-resonance and generate a prescribed output voltage Vout, as described above, is given by the following equation:

$$Po = (1/2) \cdot Lp \cdot Ipp^2 \cdot f$$

where Lp is the inductance of the primary coil P1 of the transformer T, Ipp is the peak current that flows through the switching element Q1, and f is the switching frequency of the switching element Q1.

Therefore, the peak current Ipp needed to obtain a fixed output voltage Vout is given by:

$$Ipp = \{2Po/(Lp \cdot f)\}^{1/2}$$
$$= (1/f)^{1/2} \cdot (2Po/Lp)^{1/2}$$

In this equation, the quantity $(2Po/Lp)^{1/2}$ is a characteristic value of the switching power supply 1 determined by factors such as the design of the switching power supply 1. Moreover, the reciprocal of the switching frequency f (that is, 1/f) is equal to the switching period T of the switching element Q1. Therefore, letting the quantity $(2Po/Lp)^{1/2}$ be a constant K, the peak current Ipp needed in the switching element Q1 to obtain a prescribed output power Po is given by:

$$Ipp \propto T^{1/2} \cdot K$$

Setting the current limit threshold value VthIS used to limit the peak current Ipp that can flow through the switching element Q1 according to the control value $T^{1/2}(=\sqrt{T}$, the square root of the switching period T) makes it possible to limit the current flowing through the switching element Q1, thereby making it possible to protect the switching element Q1 from overcurrent.

As described above, the input correction circuit 10 takes advantage of this fact and sets the current limit threshold value VthIS according to the switching period T or the switching frequency f of the switching element Q1. This makes it possible to maintain a fixed output power Po while simultaneously protecting the switching element Q1 from overcurrent regardless of fluctuations in the input voltage Vin. Moreover, using the switching period T of the switching element Q1 makes it possible to obtain the current limit threshold value VthIS using a simple calculation and also makes it possible to set the current limit threshold value VthIS with sufficiently high precision.

Figure 4:
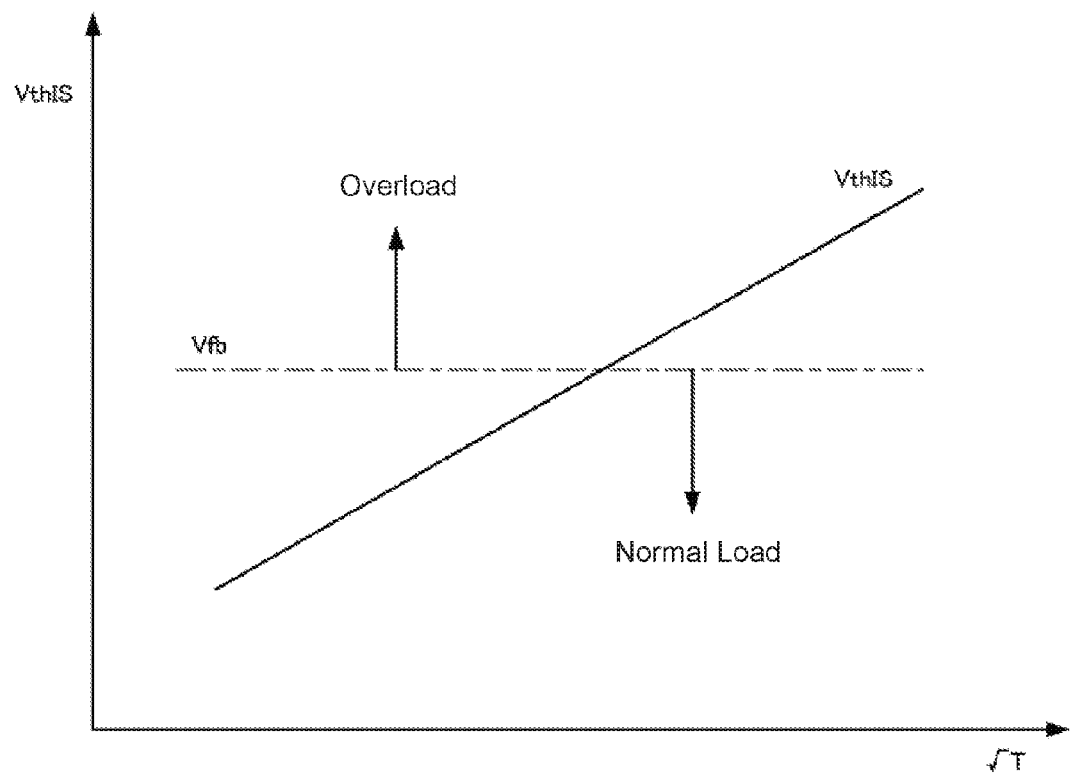
FIG. 4 is a graph showing the relationship between the control value $T^{1/2}(=\sqrt{T})$ and the current limit threshold value VthIS.

During a normal load, the current limit threshold value VthIS is set to a value higher than the detected feedback control value Vfb. When the circuit becomes overloaded, however, the current limit threshold value VthIS is set to a value lower than the detected feedback control value Vfb. As illustrated in FIG. 4, during a normal load, the current limit threshold value VthIS is higher than the feedback control value Vfb (that is, VthIS>Vfb), and therefore the current comparator 5 compares the current detection value Vis that corresponds to the current flowing through the switching element Q1 with the feedback control value Vfb that corresponds to the DC output voltage Vout. When the current detection value Vis becomes equal to the feedback control value Vfb, the current comparator 5 outputs a signal that resets the flip-flop 6 and turns the switching element Q1 OFF.

Meanwhile, as illustrated in FIG. 4, when the circuit becomes overloaded, the feedback control value Vfb becomes higher than the current limit threshold value VthIS (that is, VthIS<Vfb). Therefore, the current comparator 5 compares the current detection value Vis that corresponds to the current flowing through the switching element Q1 with the current limit threshold value VthIS. When the current detection value Vis becomes equal to the current limit threshold value VthIS, the current comparator 5 outputs a signal that resets the flip-flop 6 and forcibly turns the switching element Q1 OFF. As a result, the peak current Ipp that can flow through the switching element Q1 is limited by the current limit threshold value VthIS, thereby making it possible to implement overcurrent protection for the switching element Q1.

Figure 5:
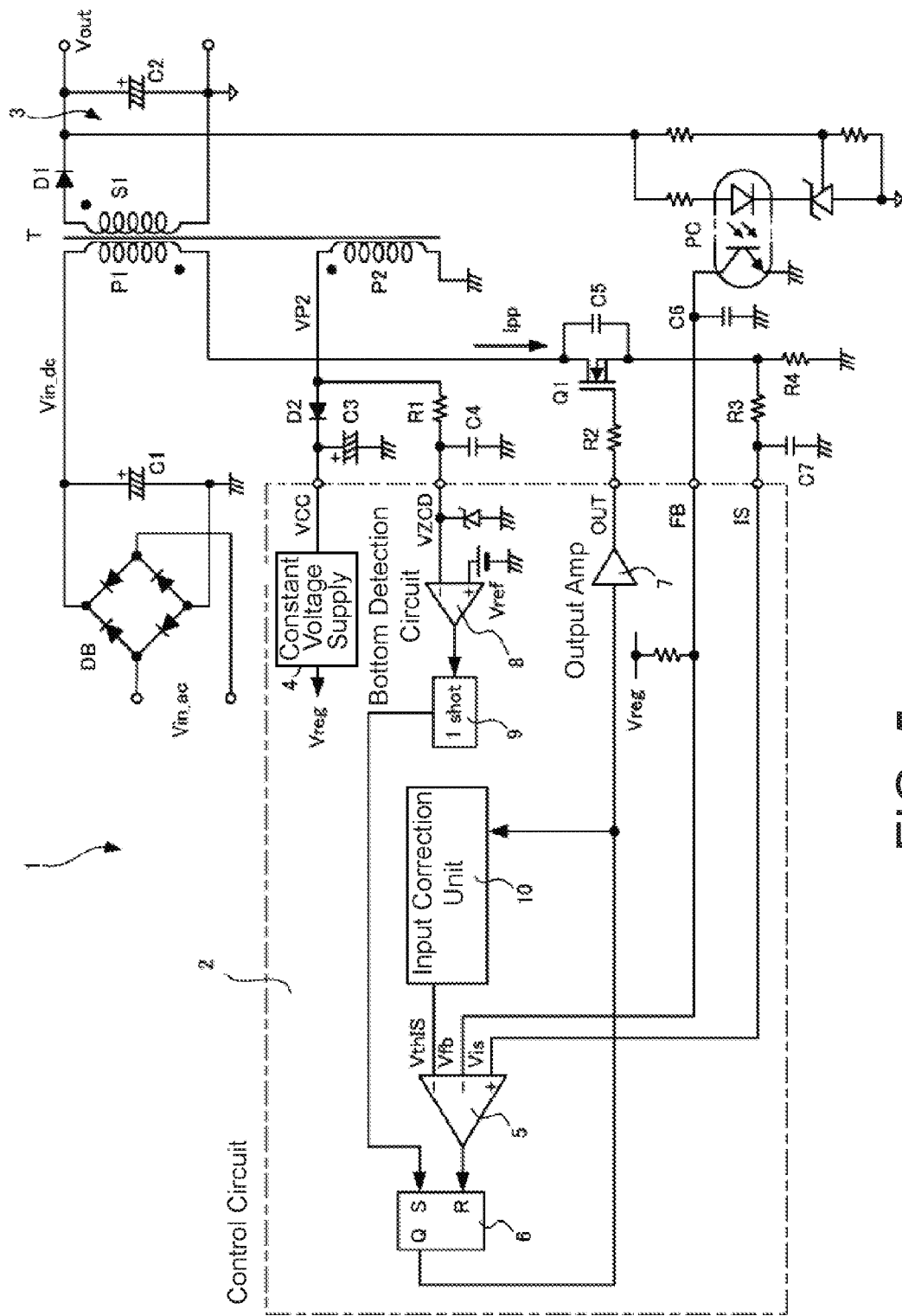
FIG. 5 schematically illustrates a configuration of a switching power supply according to another embodiment of the present invention.

It should be noted that the present invention is not limited to the embodiment described above. As illustrated in FIG. 5, for example, in a switching power supply 1 according to another embodiment of the present invention, the input correction circuit 10 may detect the switching period T according to the Q output of the flip-flop 6 (that is, according to the control signal used to turn the switching element Q1 ON and OFF). Moreover, the current limit threshold value VthIS that is proportional to the control value $T^{1/2}(=\sqrt{T})$ may be digitally obtained from a ROM or the like and D/A-converted before being input to the current comparator 5. In addition, various other modifications may be made without departing from the spirit of the present invention.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power supply, comprising:
    a transformer having a primary coil and a secondary coil;
    a switching element that is connected in series to the primary coil of the transformer so as to turn a direct-current input voltage applied to the primary coil of the transformer ON and OFF;
    a rectifying and smoothing circuit that rectifies a voltage induced in the secondary coil of the transformer to generate a direct-current output voltage; and
    a control circuit that turns the switching element ON and OFF in accordance with the direct-current output voltage,
    wherein the control circuit includes an input correction circuit that detects a switching period of the switching element and limits a peak value of a current flowing through the switching element in accordance with the detected switching period, and
    wherein the input correction circuit includes: a period detection circuit that detects the switching period T of the switching element; a calculation circuit that calculates a control value $T^{1/2}(=\sqrt{T})$ based on the switching period T detected by the period detection circuit; and a comparison voltage generation circuit that obtains, in accordance with the control value $T^{1/2}$ calculated by the calculation circuit, a current limit threshold value VthIS for limiting the peak value of the current that flows through the switching element.

2. The switching power supply according to claim 1, wherein the control circuit is a quasi-resonant control circuit that causes resonance in a current flowing in the transformer by turning the switching element OFF when a current flowing through the switching element while the switching element is ON reaches a feedback control value determined in accordance with the direct-current output voltage and turning the switching element ON when the current flowing in the transformer while the switching element is OFF has inverted.

3. The switching power supply according to claim 1, wherein the period detection circuit obtains the switching period T of the switching element from a timing at which a current flowing in the transformer while the switching element is OFF has inverted.

4. The switching power supply according to claim 1, wherein the period detection circuit obtains the switching period T of the switching element from a drive signal for turning the switching element ON and OFF.

5. The switching power supply according to claim 1, wherein during a normal load, the control circuit compares a current detection value Vis corresponding to the current flowing through the switching element to the feedback control value Vfb detected in accordance with the direct-current output voltage, and during an overload, compares the current detection value Vis to the current limit threshold value VthIS generated by the input correction circuit in order to forcibly turn OFF the switching element and thereby limit the peak value of the current that flows through the switching element.

6. The switching power supply according to claim 5, wherein the control circuit compares the current detection value Vis that corresponds to the current flowing through the switching element to a higher voltage among the feedback control value Vfb and the current limit threshold value VthIS to turn the switching element OFF.

7. A switching power supply, comprising:
a transformer having a primary coil and a secondary coil;
a switching element that is connected in series to the primary coil of the transformer so as to turn a direct-current input voltage applied to the primary coil of the transformer ON and OFF;
a rectifying and smoothing circuit that rectifies a voltage induced in the secondary coil of the transformer to generate a direct-current output voltage; and
a control circuit that turns the switching element ON and OFF in accordance with the direct-current output voltage,
wherein the control circuit includes an input correction circuit that detects a switching period of the switching element and limits a peak value of a current flowing through the switching element in accordance with the detected switching period, and
wherein the input correction circuit includes: a frequency detection circuit that detects a switching frequency f of the switching element; a calculation circuit that calculates a control value $T^{1/2}(=\sqrt{T})$ based on the switching period T as obtained from the switching frequency f detected by the frequency detection circuit; and a comparison voltage generation circuit that obtains, in accordance with the control value $T^{1/2}$ calculated by the calculation circuit, a current limit threshold value VthIS for limiting the peak value of the current that flows through the switching element.

* * * * *

UNITED STATES PATENT AND TRADEMARK OFFICE
CERTIFICATE OF CORRECTION

| | | |
|---|---|---|
| PATENT NO. | : 9,667,155 B2 | Page 1 of 1 |
| APPLICATION NO. | : 14/988455 | |
| DATED | : May 30, 2017 | |
| INVENTOR(S) | : Naotaka Matsuda | |

It is certified that error appears in the above-identified patent and that said Letters Patent is hereby corrected as shown below:

In the Specification

Column 4, Line 54, formula "$T^{1/2}(=\cdot T)$" should be changed to -- $T^{1/2}(=\sqrt{T})$ --.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*